though 11-73 OR 3,778,283

United States Patent Office 3,778,283
Patented Dec. 11, 1973

3,778,283
BINDERS BASED ON ALKALI METAL SILICATES
Helmut von Freyhold, Dusseldorf-Oberkassel, Germany, assignor to Henkel & Cie G.m.b.H., Dusseldorf-Holthausen, Germany
No Drawing. Filed Feb. 28, 1972, Ser. No. 230,084
Claims priority, application Germany, Mar. 3, 1971, P 21 10 059.4
Int. Cl. C09d 1/04
U.S. Cl. 106—84
6 Claims

ABSTRACT OF THE DISCLOSURE

Binders based on aqueous alkali metal silicate solutions comprise an admixture of triglycidylisocyanurate with an epoxide content over 14% by weight, in amounts from 0.03 to 2.0% by weight, based on the solid content of the alkali metal silicate solution; water-soluble amines which contain at least 2 active hydrogen atoms, bound to nitrogen, in amounts from 0.1 to 5% by weight, based on the solid content of the alkali metal silicate solution; and water-soluble quaternary and/or polyquaternary nitrogen compounds in amounts from 0.1 to 5% by weight, based on the solid content of the alkali metal silicate solution.

BACKGROUND OF THE INVENTION

Alkali metal silicate solutions and dispersions have been known for a long time as binders for cements and mineral insulating materials, for impregnating and for covering masses of materials, as well as for use as coating agents particularly in paints. They are used to a large extent in these technologies.

If alkali metal silicate solutions are used alone as binders for the named purposes, the respective cements, insulating layers, coverings and coatings in many cases do not fulfiill the manifold technical requirements. Thus, for example, alkali metal silicate solutions per se are frequently deficient in the properties of hardness, elasticity, and the stability toward temperature, water and atmospheric influences. For this reason numerous proposals for the improvement of these properties through appropriate admixtures have already beend made. It has been suggested to use as hardeners for the above binders, known acids, acid releasing compounds and acidic reacting compounds, as well as using basic reacting products, particularly urea. To increase the elasticity of these binders, it is already known to use adducts of polyacrylates or of phenolic resins and urea resins. The large number of kown compositions shows, however, that the attained effects are not yet satisfactory in actual practice.

Recently it has also been proposed, to prepare binders based on alkali metal silicates containing triglycidylisocyanurate and water soluble amines. However, the amine components must be used in relative large amounts. These binders form a smooth film free of cracks on the most varied base materials, as well as having a high stability toward water and a remarkable elasticity.

OBJECTS OF THE INVENTION

It is an object of the present invention to provide an adhesive binder consisting essentially of an aqueous alkali metal silicate solution consisting essentially of (a) from 88% to 99.77%, based on weight of the total composition, of an aqueous solution of alkali metal silicate having a mol ratio of silicon dioxide to alkali metal oxide of from 2:1 to 4:1, said solution containing from 20% to 37% by weight of $SiO_2$, (b) from 0.03% to 2.0% by weight, based on the solid content of the alkali metal silicate solution of a triglycidylisocyanurate having an epoxide content over 14% by weight; (c) from 0.1% to 5% by weight, based on the solid content of the alkali metal silicate solution of water-soluble amines having at least one primary or secondary amino group with at least 2 active hydrogen atoms bound to the total of nitrogen atoms in the amine; and (d) from 0.1% to 5% by weight, based on the solid content of alkali metal silicate solution of a water-soluble quaternary nitrogen compound having from 4 to 24 carbon atoms per nitrogen atom selected from the group consisting of monoquanternary nitrogen compounds and polyquaternary nitrogen compounds.

A further object of the present invention is to provide a moldable thermally insulating composition consisting essentially of (a) from 28.6% to 90% by weight based upon the total weight of the novel binder of the invention; (b) from 0% to 13% by weight based upon the total weight of water; (c) from 0% to 2% by weight based upon the total weight of a foaming agent; and (d) from 10% to 71.4% by weight based upon the total weight of inorganic particulate materials.

Other and further objects of the present invention will become apparent as the description thereof proceeds.

DESCRIPTION OF THE INVENTION

It has now been found that the content of triglycidylisocyanurate and water-soluble amines as described in the prior art in connection with aqueous alkali metal silicate solutions for binders may be considerably reduced with the binder properties substantially improved by utilizing the below described binders.

The novel binders on the basis of alkali metal silicate are characterized by a content of (a) triglycidylisocyanurate with an epoxide content over 14% by weight, in amounts from 0.03% to 2.0% by weight, based on the solid content of the alkali metal silicate solution, (b) water-soluble amines which contain at least 2 active hydrogen atoms, bound to nitrogen, in amounts from 0.1% to 5% by weight, based on the solid content of the alkali metal silicate solution, and (c) quaternary and/or polyquaternary nitrogen compounds in amounts from 0.1 to 5% by weight, based on the solid content of the alkali metal silicate solution.

More particularly the novel adhesive binders of the present invention consist essentially of an aqueous alkali metal silicate solution consisting essentially of (a) from 88% to 99.77%, based on weight of the total composition, of an aqueous solution of alkali metal silicate having a weight ratio of silicon dioxide to alkali metal oxide of from 2:1 to 4:1, said solution containing from 20% to 37% by weight of $SiO_2$; (b) from 0.03% to 2.0% by weight, based on the solid content of the alkali metal silicate solution of a triglycidylisocyanurate having an epoxide content over 14% by weight; (c) from 0.1% to 5% by weight, based on the solid content of the alkali metal silicate solution of water-soluble amines having at least one primary or secondary amino group with at least 2 active hydrogen atoms bound to the total of nitrogen atoms in the amine; and (d) from 0.1% to 5% by weight, based on the solid content of the alkali metal silicate solution of a water-soluble quaternary nitrogen compound having from 4 to 24 carbon atoms per nitrogen atom selected from the group consisting of monoquaternary nitrogen compounds and polyquaternary nitrogen compounds.

The preparation of purified triglycidylisocyanurate with an expoxide content of more than 14% has been known, and is not an object of the present application. The purified triglycidylisocyanurate is prepared, for example, by reacting cyanuric acid with an excess of epichlorohydrin and purification of the formed, uncrystallized crude product. This can be done, for example, by a single recrystallization or by several recrystallizations from suitable solvents, such as methanol. In this way a crystallized product with the desired epoxide content is obtained. The theoretical epoxide content of a completely pure product is about 16.1%.

Suitable amine compounds containing at least 2 active hydrogen atoms bonded to nitrogen are those which contain one or preferably several primary and/or secondary amino groups. The amines can be both of aliphatic and of cyclic structure. The cyclic amines may contain both cycloaliphatic, aromatic and heterocyclic rings. Such amines may be used which contain rings different from the mentioned rings. The amino nitrogen in heterocyclic rings may also be a part of the ring. Examples of primary and secondary amines are propylamine, hexylamine, dodecylamine, benzylamine, ethylenediamine, propylene diamine, butylenediamine, diethylenetriamine, triethylenetetramine, dimethylaminopropylamine, diethylaminopropylamine, cyclohexylamine, 1,2- or 1,4-diaminocyclohexane, 1,2-diamino-4-ethylcyclohexane, 1-cyclohexyl-3,4-diaminocyclohexane, 4,4'-diaminodicyclohexylmethane.

Also such amines can be used for the reaction, according to the invention, which contain other functional groups, such as ethanolamine, propanolamine or the reaction products of amines with ethylene oxide or propylene oxide, such as N-(hydroxyethyl)-1,2-diaminopropane, N-(hydroxypropyl)-m-phenylenediamine, N,N'-di-(hydroxybutyl)-diethylenetriamine. Further are suitable dicyanoethylethylenediamine, 1,4-bis-(γ-aminopropoxymethyl)-cyclohexane, N - (4-hydroxybenzyl) - ethylenediamine, N-(4-hydroxybenzyl)-diethylenetriamine.

Preferably the water-soluble amines containing at least 2 active hydrogen atoms bonded to nitrogen are alkylamines having 1 to 14 carbon atoms, cyclohexylamine, phenylalkylamines having 7 to 14 carbon atoms, alkylphenylalkylamines having 8 to 14 carbon atoms, alkylenediamines having 2 to 14 carbon atoms, polyalkylenepolyamines having 4 to 14 carbon atoms, di-lower alkylamino, lower alkylamines, cyclohexylenediamines, alkylcyclohexylenediamines having 7 to 14 carbon atoms, cyclohexylenediamines, diamino-dicyclohexyl-lower alkanes, alkylolamines having 2 to 14 carbon atoms, N-(lower alkylol)-lower alkylenediamines, N-(lower alkylol)-phenylenediamines, N,N'-(di-lower alkylol)-lower alkylenediamines, N,N'-(di-lower alkylol)-diethylenetriamines, dicyanoethylethylenediamine, bis-(amino lower alkoxy-lower alkyl)-cyclohexanes, N-(4-hydroxybenzyl)-ethylenediamine and N-(4-hydroxybenzyl)-diethylenetriamine.

The amount of amine utilized depends upon the kind of amine, and particularly upon the number of active hydrogen atoms bound to the nirtgoen atoms. It has generally proven appropriate to use from 0.6 to 1.1, preferably 0.8 to 1 equivalent of active hydrogen of the amine component for each one equivalent of epoxide oxygen of the triglycidylisocyanurate.

The amount of the amines added therefore ranges from 0.1% to 5% by weight, based on the solid content of the alkali metal silicate solution.

The concentration of the alkali metal silicate solutions and the molar ratio of $SiO_2$: alkali metal oxide in the solutions may vary within wide limits and depends upon the respective application of the binder. Preferably the mol ratio of silicon dioxide to alkali metal oxide is from 2:1 to 4:1 and the amount of $SiO_2$ in the aqueous alkali metal silicate solutions is from 20% to 37% by weight.

Generally commercial sodium, potassium and/or lithium silicate solutions are used.

Mono- and/or polyquaternary nitrogen compounds are preferably used in the form of the hydroxides. If desired however, the salts of the quaternary nitrogen compounds such as chlorides, sulfates or nitrates may be used. Preferably the water soluble quaternary nitrogen compounds employed are those which have at least one alkyl radical, not substituted by hydroxyl groups, on the nitrogen atom.

The other 3 groups, bound to the nitrogen atom, can be comprised by alkyl or alkanol radicals and may be identical to or different from each other. These alkyl or alkanol residues may be straight chain or branched chain; and the carbon chain may be interrupted by hetero atoms such as oxygen or nitrogen. Moreover, 2 groups on the nitrogen may be joined ring-like to form a piperidino, morpholino, pyrrolidino and piperazino ring. The total number of the carbon atoms of the quaternary nitrogen compounds may vary in wide limits and is limited only by the requirement that the compounds still have to be water-soluble. In quarternary nitrogen compounds having a long chain radical, the latter may have up to about 18 carbon atoms. If more than one long chain radical is bound to the quaternary nitrogen atom, then this chain length is generally limited to 12 carbon atoms. The quaternary nitrogen compounds, according to the invention, may contain one or more quarternary nitrogen radicals. Also mixtures of different quaternary nitrogen compounds may be used.

Preferably, the quaternary nitrogen compounds are those water-soluble compounds which contain in the molecule from 4 to 24 carbon atoms per nitrogen atom.

Among these compounds are those of the formulae

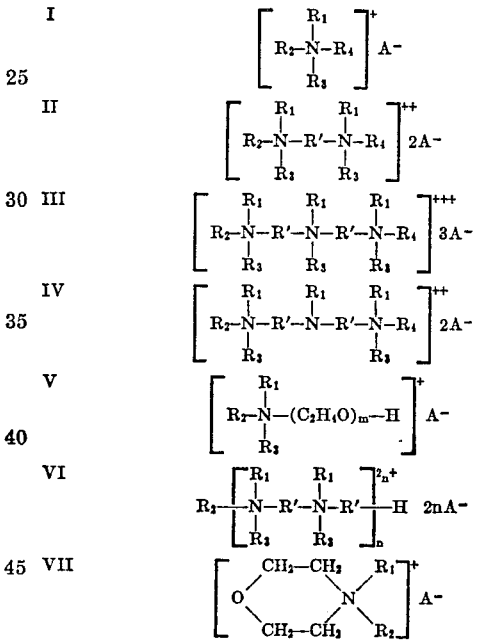

wherein $R_1$, $R_2$, $R_3$ and $R_4$ are members selected from the group consisting of alkyl having from 1 to 12 carbon atoms and alkylol having from 1 to 4 carbon atoms; $R'$ is alkylene having from 2 to 12 carbon atoms; $n$ is an integer from 20 to 100; $m$ is an integer from 2 to 10; and A represents a member selected from the group consisting of hydroxyl and the acyl of a strong mineral acid; with the proviso that from 4 to 24 carbon atoms are present per nitrogen atom in the molecule.

Specifically as mono and/or polyquaternary nitrogen compounds are especially the following compounds of Table I.

Examples of quaternary nitrogen compounds listed below may be utilized, but they are not to be deemed limitative of the invention in any manner.

TABLE I

| | |
|---|---|
| I. | [N(CH$_3$)$_4$]OH |
| II. | [N(C$_2$H$_5$)$_4$]OH |
| III. | [N(CH$_2$OH)$_4$]OH |
| IV. | [N(C$_2$H$_4$OH)$_4$]OH |
| V. | [N(C$_6$H$_{13}$)$_4$]OH |
| VI. | [(CH$_3$)$_3$N(C$_{10}$H$_{21}$)$_3$]OH |
| VII. | [(CH$_3$)$_3$N(C$_{12}$H$_{25}$)]OH |
| VIII. | [(CH$_3$)N(C$_2$H$_4$OH)$_3$]OH |

TABLE I—Continued

IX.    [(C₂H₅)₂N(C₂H₄OH)₂]OH
X.     [(CH₃)₃N(CH₂)₆N(CH₃)₃](OH)₂
XI.    [(CH₃)₃N(CH₂)₁₂N(CH₃)₃](OH)₂

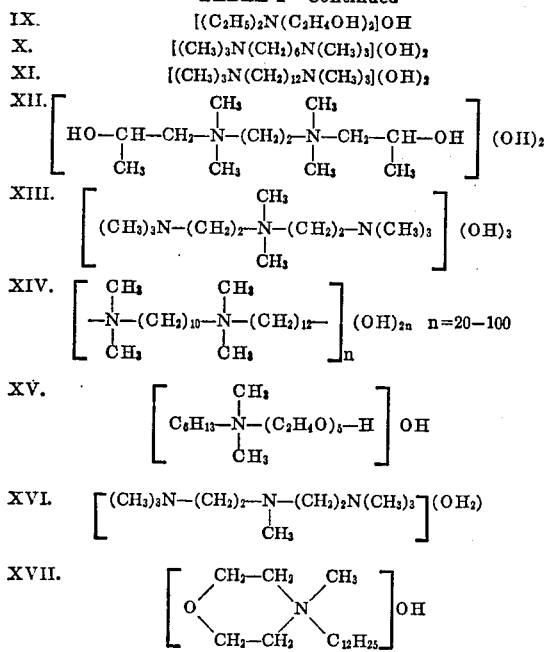

Instead of the above listed hydroxides it is possible to use the water soluble salts of the quaternary nitrogen compounds, preferably the chlorides, sulfates and nitrates.

Preferably such quaternary nitrogen compounds are used, which have four alkyl groups bound on the nitrogen atom.

The mono- and/or polyquaternary nitrogen compounds are likewise added in small amounts, namely about 0.1% to 5% by weight, based on the solids content of the alkali metal silicate solution. Although unnecessary, it is possible to use larger amounts of the quaternary nitrogen compounds.

The novel binders may be used for many applications, for example, for the preparation of fire-proof molded bodies, and for adhesives and coating agents, particularly zinc-dust coatings. Other admixtures are optionally considered which are suitable as pigments, fillers or hardeners depending upon the application. For use as hardeners, secondary and tertiary phosphates of divalent or trivalent metals, such as calcium hydrogen phosphate, calcium polyphosphates and phosphates of aluminum, zinc and iron have proven particularly suitable. Furthermore, calcium and magnesium silicates such as dicalcium silicate, technical blast-furnace slag with a composition which corresponds to about that of dicalcium silicate, and diopside, wollasonite and talc may be used as hardeners.

The novel binders may contain the conventional alkali-resistant pigments and fillers, such as chalk, kaolin, zinc oxide, chrome green, iron oxide-pigments as well as mica and perlite.

The preparation of the binder is carried out by a simple mixing of the components. The triglycidylisocyanurate (TGI) is first mixed into the silicate solution with agitation. This can be done appropriately at slightly elevated temperatures (20° to 50° C.) and in solid form, generally as a crystallized soid. The TGI could also be dissolved in water or suspended in it and then added to the silicate solution. Subsequently the amine component, which is preferably dissolved or suspended in a small amount of water, is added with stirring. The quaternary or polyquaternary ammonium compounds may be added to the solution in any sequence either as a solid or as an aqueous solution.

The novel binders are suitable for the joining of wood, paper, glass, ceramics and mineral material. As a result of coating with these agents, smooth films free of cracks are produced on substrates of the above named materials.

The novel binders have the advantage that they can be prepared with reduced amounts of the up-to-now very large amounts of amine adducts. Furthermore they possess considerably improved properties with respect to the already known water-glass binders. On the one hand, the attained improvements have a beneficial effect on the processing of the binders; and on the other hand these improvements have a beneficial effect on the properties of the compounds, coatings and compound bodies which are produced with the aid of these binders. For example, in regard to the improvements in the rheological properties of the novel binders, materials such as synthetic resins, polyalcohols, saccharides, and the like, can be added to the novel binders in such amounts, which when added to conventional water-glass binders, are already known to cause coagulation or gelation. In the same way, hydrophobic substances, such as silicones and silicates can be incorporated into the novel binders in larger amounts than can be incorporated into conventional water-glass binders. Also the course of the hardening processes is more easily controllable with the novel agents. In this regard it is possible to modify the water-glass binders in manifold ways, in order to attain the desired results in the adhesives or cements, coatings, coverings and compound bodies.

The present invention therefore also provides a moldable thermally insulating composition consisting essentially of (a) from 28.6% to 90% by weight based upon the total weight of the novel binder of the invention; (b) from 0% to 13% by weight based upon the total weight of water; (c) from 0% to 2% by weight based upon the total weight of a foaming agent; and (d) from 10% to 71.4% by weight based upon the total weight of inorganic particulate materials.

The proportions and percents contained in the following examples are by weight. These examples are merely illustrative and are not to be deemed limitative of the invention in any manner:

Example 1

0.09 part of triglycidylisocyanurate were dissolved in 2.2 parts of boiling water to form a first solution. 96.4 parts of a sodium silicate solution ($SiO_2:Na_2O = 3.9:1$; 22.4% of $SiO_2$) were heated to 55 to 60° C. and the first solution was added thereto. This first mixture was cooled to 40° C. and 0.06 part of tetraethylenepentamine, dissolved in 1.2 parts of water, were added to form a second mixture. The second mixture was cooled to 20° C. and 0.1 part of a 20% tetraethyl ammonium hydroxide solution added.

For the production of molded insulating bodies 28.6 parts of the above described water-glass binder were thoroughly admixed with 47.6 parts of Vermiculite K 3, 19.1 parts of diopside (calcium-magnesium silicate) and 4.7 parts of calcium hydrogen phosphate dihydrate. This mass had a processing time of at least 2 hours. It was compressed in a molding press to 50 to 60% of the initial volume. The molded bodies thus obtained, had immediately after molding an initial strength sufficient for transportation. By means of a conventional drying process for 9 hours at 120° C. they obtained their final strength. The fireproofness of the so obtained insulating bodies corresponded to the conditions of DIN 4102. That is the insulating bodies showed less than 1% of edge contraction after having been heated for 3 hours at 1150° C.

If, for the production of the insulating bodies, the above described sodium silicate, without the admixtures of triglycidylisocyanurate, amine and quaternary ammonium compound was used, the freshly prepared mixture had a processing time of at most 20 minutes. In order to avoid crack formation and contraction during drying, the molded bodies had to be slowly heated up, whereby the drying time was about doubled. The final strength of these insulating bodies was 30% less and the thermal stability was about 100° C. lower than for the bodies, prepared with the novel binders, according to the invention.

Binders with comparable properties were obtained if equivalent amounts of Compounds III, V, VII or XIII, named in the specification, were incorporated into the above named composition, instead of tetraethyl ammonium hydroxide. Tetraethylenepentamine could be replaced by equivalent amounts of dodecylamine, cyclohexylamine, 1,2-diaminocyclohexane, propanolamine or N,N'di-(hydroxybutyl)-diethylenetriamine.

Example 2

200 parts of sodium silicate solution $(SiO_2:Na_2O=3.05:1;$

43°/45° Bé.; 31% of $SiO_2$) were heated to 60° C. and mixed with 0.2 part of triglycidylisocyanurate, dissolved in 4.5 parts of water. After cooling to room temperature, 0.08 part of ethylenediamine, dissolved in 2.5 parts of water, and 0.04 part of a diquaternary compound of the formula

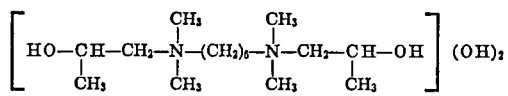

in the form of a 20% solution and 8 parts of sodium trimethyl siliconate were added.

The silicate binder, thus obtained, was particularly suitable for the preparation of coating materials for asbestos cement plates as described herein below:

65.5 parts of binder, 4.35 parts of titanium dioxide (anatase), 4.35 parts of chalk, 6.55 parts of zinc oxide, 6.50 parts of calcium hydrogen phosphate dihydrate and 13.0 parts of water were mixed together. Then 0.4 part of a liquefier of 4 parts of sodium metasilicate and 1 part of 1-hydroxyethane-1,1-diphosphonic acid were added to form a mixture.

The mixture was applied in a thin layer to asbestos cement plates, dried for 12 hours at room temperature and subsequently hardened by heating for 3½ hours at 140°–145° C.

The coatings produced had hydrophobic properties and were waterproof and boiling proof.

Equivalent amounts of propylamine, hexylamine, dicyanoethylethylenediamine or N - (4 - hydroxybenzyl)-ethylenediamine may be incorporated into the preceding silicate binder composition in lieu of ethylenediamine.

Example 3

260 parts of potassium silicate solution $(SiO_2:K_2O=2.58:1;$

28°/30° Bé.; 22% of $SiO_2$) were mixed at 60° to 65° C. with 0.2 part of triglycidylisocyanurate, dissolved in 4.5 parts of water. After the mixture was cooled to room temperature, 0.1 part of diethylenetriamine, dissolved in 3 parts of water, and 0.03 part of N-dodecyl-N-methyl morpholinium hydroxide in the form of an 18% solution were added.

The binder, thus obtained, was particularly suitable for waterproof and fireproof cementing of mineral fibers, mineral-fiber plates, mineral wool and the like. In order to regulate the binding time of the binder mixture, 10% to 30% of calcium hydrogen phosphate dihydrate, calcium disilicate or mixture of these substances were added to the binder mixture. However, other substances, such as silicofluorides, Anhydrite® or carboxylic acid esters could be used as hardeners. A short heating time at 50° to 80° C. imparts a particularly high water resistance to the cementings.

Binders with comparable properties are also obtained if, in the preceding composition, the N-dodecyl-N-methylmorpholinium hydroxide is replaced by equivalent amounts of the ammonium sulfates or ammonium nitrates, which correspond to the bases VI, VIII, IX and XV, named supra in the specification. Diethylenediamine may be replaced by propylenediamine, triethylenetetramine, 1,4 - bis - (γ-aminopropoxymethyl) - cyclohexane or N-(4 - hydroxybenzyl) - diethylenetriamine in equivalent amounts.

Example 4

A water-glass binder was prepared analogously to Example 1 by mixing of 150 parts of sodium silicate solution $(SiO_2:Na_2O=3.3:1;$ 37°/40° Bé.; 27.0% of $SiO_2$), 0.14 part of triglycidylisocyanurate in 3 parts of water, 0.15 part of ethanolamine in 1.8 parts of water and 0.04 part tetrahydroxyethyl ammonium hydroxide in 0.16 parts of water.

Binders having comparable properties result when equivalent amounts of the compounds I, X, XI, XIV and XVI, named supra in the specification, or of ammonium chlorides, corresponding to the compounds VI, VIII and XV, are used, instead of tetrahydroxyethylammonium hydroxide. Instead of ethanolamine equivalent amounts of butylenediamine, N - (hydroxyethyl) - 1,2 - diaminopropane, N-(hydroxypropyl) - m - phenylenediamine or N-(4-hydroxybenzyl)-diethylentriamine may be incorporated into the above binder composition.

For the production of insulating foam materials, 40 parts of this binder, 1 part of 1% potassium permanganate solution or pyrolosite dispersion, 41 parts of mineral fiber (pumice, swell clay, or volcanic ash), 1 part of calcium hydrogen phosphate dihydrate, 2 parts of sodium silicofluoride and 13 parts of water were mixed together. The mixture was reacted with 2 parts of 30% hydrogen peroxide solution and subsequently poured into molds.

The mass foamed, increased its volume by 50 to 100% during the next 40 minutes, and hardened at the same time. After two hours it had hardened to a sufficient initial strength. After a subsequent 24 hour air drying and a subsequent 6 hours heat treatment at 135° C., the foam materials possessed the desired final strength. Dependent upon the kind of admixtures utilized, they were stable up to temperatures between 800° and 1400° C.

Instead of the combination hydrogen peroxide/potassium permanganate and hydrogen peroxide/pyrolusite, substances may also be used which evolve hydrogen when in contact with alkali metal silicate, such as aluminum powder, ferrosilicon powder or silicon powder.

The foam materials, prepared with the use of the binder, according to the invention, were superior in regard to hardness, strength, elasticity, ability to absorb water and dimensional stability, as when compared to materials which contained merely an otherwise identical amount of a conventional waterglass binder.

Example 5

The technical properties of the mineral, insulating foam materials, according to Example 4, could be considerably improved, if they were treated with a silicate binder, according to Example 2, by the brushing, spraying or dipping process. The sodium silicate solution of Example 2 could be advantageously replaced thereby by a sodium water-glass of the density 28°/30° Bé. with a ratio $SiO_2:Na_2O$ of 3.9:1.

The compression strength of the foam materials was considerably increased by this treatment; at the same time the ability to absorb water was reduced by about 80%.

Example 6

Water-glass binders, according to Example 2, which contained instead of the sodium silicate described there, a potassium water-glass $(SiO_2:K_2O=2.58:1; 28°/30°$ Bé.; 21.6% of $SiO_2$) were applied with good success as impregnating agents against water absorption for mineral building materials, such as stone plates, concrete, spray-asbestos insulations, asbestos fiber and dicalcium phosphates.

The impregnating effect was not impaired by chemical effects, such as deicing chemicals.

Example 7

Water-glass compositions, according to Example 1, but based upon a more concentrated sodium silicate solution with a higher percent of $Na_2O$ ($SiO_2:Na_2O=2.4:1$; 50° Bé.; 33.3% or $SiO_2$) proved particularly suitable as binders for casting cores.

In the preparation of the casting cores 100 parts of molding sand were mixed with 3 to 8 parts of binder. The molded cores were hardened by the known carbon dioxide process or by high-frequency treatment.

The casting cores were distinguished by increased hardness, nondeformability and insensitivity to moisture.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

I claim:

1. An adhesive binder consisting essentially of an aqueous alkali metal silicate solution consisting essentially of (a) from 88% to 99.77%, based on weight of the total composition, of aqueous alkali metal silicate having a mol ratio of silicon dioxide to alkali metal oxide of from 2:1 to 4:1, said solution containing from 20% to 37% by weight of $SiO_2$; (b) from 0.03% to 2.0% by weight, based on the solid content of the alkali metal silicate solution of a triglycidylisocyanurate having an epoxide content over 14% by weight; (c) from 0.1% to 5% by weight, based on the solid content of the alkali metal silicate of water-soluble amines having at least one primary or secondary amino group with at least 2 active hydrogen atoms bound to the total of nitrogen atoms in the amine, said amine having from 0.6 to 1.1 equivalents of active hydrogen for each one equivalent of epoxide oxygen in said triglycidylisocyanurate; and (d) from 0.1% to 5% by weight, based on the solid content of the alkali metal silicate solution of a water-soluble quaternary nitrogen compound having from 4 to 24 carbon atoms per nitrogen atom selected from the group consisting of monoquaternary nitrogen compounds and polyquaternary nitrogen compounds.

2. The adhesive binder of claim 1 wherein said water-soluble amine of component (c) is selected from the group consisting of alkylamines having 1 to 14 carbon atoms, cyclohexylamine, phenylalkylamines having 7 to 14 carbon atoms, alkylphenylalkylamines having 8 to 14 carbon atoms, alkylenediamines having 2 to 14 carbon atoms, polyalkylenepolyamines having 4 to 14 carbon atoms, di-lower alkylamino, lower alkylamines, cyclohexylenediamines, alkylcyclohexylenediamines having 7 to 14 carbon atoms, cyclohexylcyclohexylenediamines, di-amino-dicyclohexyl-lower alkanes, alkylolamines having 2 to 14 carbon atoms, N-(lower alkylol)-lower alkylenediamines, N-(lower alkylol)-phenylenediamines, N,N'-(di-lower alkylol)-diethylenetriamines, dicyanoethylethylenediamine, bis-(amino-lower alkoxy-lower) alkyl)-cyclohexanes, N-(4 - hydroxybenzyl)-ethylenediamine and N-(4-hydroxybenzyl)-diethylenetriamine.

3. The adhesive binder of claim 1 wherein said water-soluble quaternary nitrogen compound of component (d) is selected from the group consisting of compounds of the formulae I 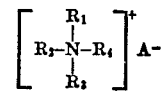

II 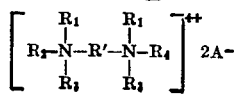

III 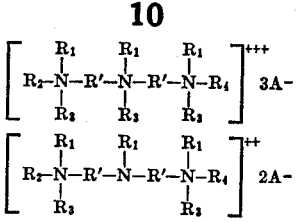

IV 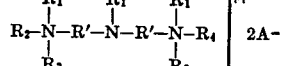

V 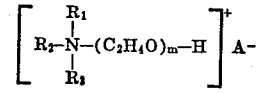

VI 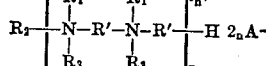

VII 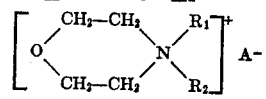

wherein $R_1$, $R_2$, $R_3$ and $R_4$ are members selected from the group consisting of alkyl having from 1 to 12 carbon atoms and alkylol having from 1 to 4 carbon atoms; R' is alkylene having from 2 to 12 carbon atoms; $n$ is an integer from 20 to 100; $m$ is an integer from 2 to 10; and A represents a member selected from the group consisting of hydroxyl and the acyl of a strong mineral acid; with the proviso that from 4 to 24 carbon atoms are present per nitrogen atom in the molecule.

4. The adhesive binder of claim 1 having a further content of a hardener for alkali metal silicates selected from the group consisting of secondary and tertiary phosphates of divalent and trivalent metals and poorly soluble silicates.

5. A moldable thermally insulating composition consisting essentially of (a) from 28.6% to 90% by weight based upon the total weight of the binder of claim 1; (b) from 0% to 13% by weight based upon the total weight of water; (c) from 0% to 2% by weight based upon the total weight of a foaming agent; and (d) from 10% to 71.4% by weight based upon the total weight of inorganic particulate materials.

6. An adhesive binder consisting essentially of an aqueous alkali metal silicate solution consisting essentially of (a) from 88% to 99.77%, based on weight of the total composition, of aqueous alkali metal silicate having a mol ratio of silicon dioxide to alkali metal oxide of from 2:1 to 4:1, said solution containing from 20% to 37% by weight of $SiO_2$; (b) from 0.03% to 2.0% by weight, based on the solid content of the alkali metal silicate solution of a triglycidylisocyanurate having an epoxide content over 14% by weight; (c) from 0.1% to 5% by weight, based on the solid content of the alkali metal silicate of water-soluble amines having at least one primary or secondary amino group with at least 2 active hydrogen atoms bound to the total of nitrogen atoms in the amine, said amine having from 0.6 to 1.1 equivalents of active hydrogen for each one equivalent of epoxide oxygen in said triglycidylisocyanurate, and said water-soluble amine being selected from the group consisting of alkylamines having 1 to 14 carbon atoms, cyclohexylamine, phenylalkylamines having 7 to 14 carbon atoms, alkylphenylalkylamines having 8 to 14 carbon atoms, alkylenediamines having 2 to 14 carbon atoms, polyalkylenepolyamines having 4 to 14 carbon atoms, di-lower alkylamino, lower alkylamines, cyclohexylenediamines, alkylcyclohexylenediamines having 7 to 14 carbon atoms, cyclohexylcyclohexylenediamines, diamino-dicyclohexyl-lower alkanes, alkylolamines having 2 to 14 carbon atoms, N-(lower alkylol)-lower alkylenediamines, N-(lower alkylol)-phenylenediamines, N,N'-(di-lower alkylol)-diethylenetriamines, dicyanoethylethylenediamine, bis-(amino-lower alkoxy-lower alkyl)-cyclohexanes, N-(4-hydroxybenzyl)-ethylenediamine and N-(4-hydroxybenzyl)-diethylenetriamine; and (d) from 0.1% to 5% by weight, based on the solid content of the alkali metal silicate solution of a water-soluble quaternary nitrogen compound having from 4 to 24 carbon atoms per nitrogen atom selected from the group consisting of compounds of the formulae I 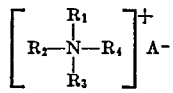

II 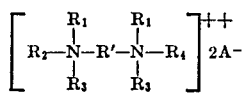

III 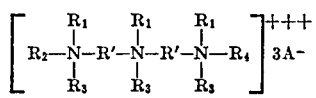

IV 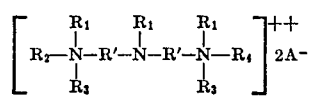

V 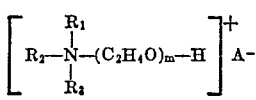

VI 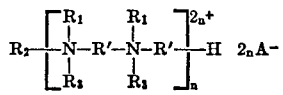

VII 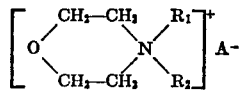

wherein $R_1$, $R_2$, $R_3$ and $R_4$ are members selected from the group consisting of alkyl having from 1 to 12 carbon atoms and alkylol having from 1 to 4 carbon atoms; $R'$ is alkylene having from 2 to 12 carbon atoms; $n$ is an integer from 20 to 100; $m$ is an integer from 2 to 10; and A represents a member selected from the group consisting of hydroxyl and the acyl of a strong mineral acid.

References Cited

UNITED STATES PATENTS

| | | | |
|---|---|---|---|
| 3,620,983 | 11/1971 | Porret | 260—77.5 NC |
| 3,625,722 | 12/1971 | Freyhold | 106—74 |
| 3,669,699 | 6/1972 | Dol | 106—74 |

THEODORE MORRIS, Primary Examiner

U.S. Cl. X.R.

106—14, 38.35, 287 S; 117—123, 147, 152, 154